United States Patent Office 3,439,098
Patented Apr. 15, 1969

3,439,098
TRIBUTYLTIN MOLLUSCICIDES
Ashley H. Freiberg, Santa Clara, Calif., assignor to Stauffer Chemical Company, New York, N.Y., a corporation of Delaware
No Drawing. Filed Dec. 9, 1964, Ser. No. 417,207
Int. Cl. A01m 9/12, 9/24
U.S. Cl. 424—288     7 Claims

ABSTRACT OF THE DISCLOSURE

The method of combating snails by contacting them with an effective amount of a compound of the formula

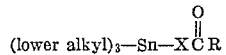

$$(\text{lower alkyl})_3-\text{Sn}-\text{X}-\overset{\text{O}}{\underset{\|}{\text{C}}}\text{R}$$

wherein the lower alkyl groups contain from 1 to 6 carbon atoms, inclusive; X is oxygen or sulfur; R is methyl, chloromethyl, chloroethyl, bromomethyl, bromoethyl, chloro-1,3-butadienyl, heptadecatrienyl, nitro-substituted benzyl, phenyl or phenyl substituted with a member from the group of lower alkyl, nitro or amino. Representative compounds are tri-i-butyltin-1-chloropropionate, tri-n-butyltin thioacetate, tri-i-butyltin thiobenzoate, tri-n-butyltin linolenate, and tri-n-butyltin 4-nitrophenylacetate. Representative gastropods controlled by this method are *Helisoma tenut*, Philippi and *Helisoma subscrenatum* Carpenter.

---

This invention relates to a method of controlling mollusks. More specifically, this invention pertains to the use of certain organotin-containing compounds to control gastropods and related animals, especially snails.

Generally, the compounds useful according to this invention are trialkyl tin compounds which may be represented by the formula

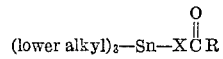

$$(\text{lower alkyl})_3-\text{Sn}-\text{X}-\overset{\text{O}}{\underset{\|}{\text{C}}}\text{R}$$

wherein the lower alkyl groups contain from 1 to 6 carbon atoms, inclusive, X is selected from the group consisting of oxygen and sulfur, and R is selected from the group consisting of alkyl, alkenyl, phenyl, substituted-phenyl, substituted-phenalkyl, substituted-alkyl and substituted-alkenyl, wherein said substituents are selected from the group consisting of amino, nitro, lower alkyl and combinations thereof.

The term snails is used herein to include both snails and slugs terrestial as well as aquatic. Snails may be members of a large class of gastropod mollusks including most forms having a univalve shell or having no shell.

Snails cause serious economic and health problems in many parts of the world. Economically, snails can be quite injurious to vegetation as they attack and destroy a wide variety of beneficial agricultural plants. Even more injurious is the fact that many snails are involved in the life cycle of many tropical and semi-tropical diseases. Millions of people and countless animals in many parts of the world are afflicted with these diseases. Parasites usually cause these tropical diseases. Snails play a significant role in the growth cycle of the parasite involved. It is in snails that larval stages develop and emerge to enter warm-blooded animals and mature into worms. The worms lay eggs which are carried to vital organs in the body by the blood stream. The eggs find their way back into snails, through water supplies and the like, and the cycle begins once more. Theoretically, a single snail can be the ancestor of three million new snails a year.

Needless to say, there is a genuine demand for combating snails with effective chemical agents. Snail control is one of the most rapid and effective means for reducing transmission of many tropical and semi-tropical diseases.

In accordance with this invention it has been found that the class of organotin compounds shown in the above formula exhibit remarkable activity against snails and related mollusks. Therefore, the provision of a method for controlling said mollusks by means of certain organotin compounds constitutes the principal object of this invention. Yet further objects will become apparent throughout the balance of the invention.

The trialkyl tin esters, the molluscicidal utility of which is herein contemplated, are known in the chemical arts. Their preparation can be carried out generally by cleaving a bis(trialkyl tin) oxide with a suitable acid. Typically, one mole of the bis(trialkyl tin) oxide and two equivalents of the acid are heated together in the presence of a relatively inert liquid organic solvent or if desired in the absence of a solvent using the reactants to make up the solution.

In practicing the present invention any of the various techniques or methods can be employed for exposing the mollusks to the toxic organotin compound. For example, bait formulations can be prepared such that the snails will seek out the treated bait. In application to a body of water for aquatic species control, effective rates may be added directly thereto. The details of compounding and application are well known to those skilled in the art.

The compounds of the present invention were tested as molluscicides according to the following method.

Molluscicidal evaluation test

In order to establish molluscicidal action, stock solutions of the candidate compounds were diluted in tap water, pH 7.5–7.8. A portion, 100 mls., of each dilution was placed in a 6-ounce cold drink Dixie cup and allowed to reach room temperature. Four common water snails from the two species, *Helisoma tenue* Philippi and *Helisoma subcrenatum* Carpenter, of approximately the same size were placed in each test cup. These species were used as representatives of snails and slugs. The snails were retained in the test solutions for 24 hours. At the end of that time the test solution was discarded and the snails were rinsed a number of times in tap water. The snails were then transferred to new Dixie cups containing only tap water. Mortality was recorded 24 hours later. The snails were considered dead if no movement was observed for a period of 8 hours and if no movement was observed in response to prodding with a dissecting needle. The snail LC-50 values in parts per million (p.p.m.) are reported in the following table.

TABLE.—MOLLUSCICIDAL ACTIVITY

| Compound No. | Lower alkyl | X | R | LC-50 in p.p.m. |
|---|---|---|---|---|
| 1 | n-C₄H₉ | O | CCl₃ | 0.03 |
| 2 | n-C₄H₉ | S | CH₃ | 0.06 |
| 3 | n-C₄H₉ | S | C₆H₅ | 0.06 |
| 4 | n-C₄H₉ | O | CCl=CClCl=CCl₂ | 0.06 |
| 5 | n-C₄H₉ | O | CH₂Br | 0.06 |
| 6 | n-C₄H₉ | O | C₆H₄-4-NH₂ | 0.06 |
| 7 | n-C₄H₉ | O | CH₂C₁₆H₂₇ | 0.06 |
| 8 | n-C₄H₉ | O | CH₂Cl | 0.06 |
| 9 | n-C₄H₉ | O | C₆H₃-2-NO₂-5-CH₃ | 0.06 |
| 10 | n-C₄H₉ | O | CHBrCH₃ | 0.06 |
| 11 | n-C₄H₉ | O | CH₂C₆H₄-4-NO₂ | 0.06 |
| 12 | i-C₄H₉ | S | C₆H₅ | 0.06 |
| 13 | i-C₄H₉ | S | CH₃ | 0.06 |
| 14 | i-C₄H₉ | O | CCl₃ | 0.03 |
| 15 | i-C₄H₉ | O | CHClCH₃ | 0.03 |

From the table it can be seen that the organotin molluscicides of the present invention control the vector species effectively at very low concentrations. The compounds may be applied in a variety of ways at various concentrations. The amount applied will depend upon the nature of the environment and particular utility. The rate of application may also vary with the mollusk species whose control is desired.

I claim:
1. A method of combating snails which comprises contacting said snails with an effective amount of a compound of the formula

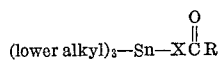

wherein the lower alkyl groups contain from 1 to 6 carbon atoms, inclusive, X is selected from the group consisting of oxygen and sulfur, and R is selected from the group consisting of methyl, chloromethyl, 1-chloroethyl, 1-bromoethyl, bromomethyl, pentachloro-1,3-butadienyl, heptadecatrienyl, phenyl, phenyl substituted with a member selected from the group consisting of lower alkyl, nitro and amino, and nitro-substituted benzyl.

2. The method of combating snails comprising contacting said snails with an effective amount of the compound tri-n-butyltin trichloroacetate.

3. The method of combating snails comprising contacting said snails with an effective amount of the compound tri-i-butyltin 1-chloropropionate.

4. The method of combating snails comprising contacting said snails with an effective amount of the compound tri-n-butyltin thioacetate.

5. The method of combating snails comprising contacting said snails with an effective amount of the compound tri-i-butyltin thiobenzoate.

6. The method of combating snails comprising contacting said snails with an effective amount of the compound tri-n-butyltin linolenate.

7. The method of combating snails comprising contacting said snails with an effective amount of the compound tri-n-butyltin 4-nitrophenylacetate.

References Cited
FOREIGN PATENTS
797,073   6/1958   Great Britain.

OTHER REFERENCES
Webbe et al.: Annals of Tropical Medicine and Parasitology, volume 58, No. 2, pp. 234–239, June 1964.

ALBERT T. MEYERS, *Primary Examiner.*

JEROME D. GOLDBERG, *Assistant Examiner.*